Patented Nov. 25, 1952

2,619,436

UNITED STATES PATENT OFFICE 2,619,436

METHOD OF CLEANING GLASS FORMING MOLDS

Taylor H. Beech, Pittsburgh, Pa.

No Drawing. Application August 6, 1946, Serial No. 688,686

1 Claim. (Cl. 134—22)

This invention relates to the method of cleaning molds for use in ware forming machines for forming glass articles, and it is among the objects thereof to provide a method whereby such molds may be rapidly cleaned without injury to the mold surface.

In the forming of glass articles by either press or blowing methods, the molds are subjected to fouling on their surfaces by the formation of a carbon deposit thereon resulting from the high temperature of the molten glass acting upon the lubricants used on the mold surfaces. Such carbon fouling of the mold surfaces requires frequent cleaning, particularly on mottled or ornamented surfaces, to maintain the sharpness of the design of the finished glass product.

Conventional mold cleaning methods consist of using light abrasives by hand cleaning, or by pickling in light or heavy concentrations of acids. Such methods are slow and expensive, involving considerable hand labor, which necessitates the use of extra molds to keep full production on a multiple mold forming machine.

In accordance with the present method the fouled surfaces of glass forming molds are rapidly cleansed by immersing them in a bath of puddled molten salts such as release nitrogen when in contact with the carbon deposits on the surface of the mold. The salt bath is heated at temperatures from 1000° to 1800° F. by gas or electric heat, and I have found that a salt having a cyanide content of about twenty per cent is suitable for the purpose.

A cyanide salt of the following reaction is useful in removing the carbon scale from mold surfaces:

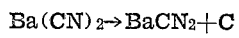

(barium cyanide)  (barium cyanamide)  (carbon)

By immersing the fouled surface of the mold in the puddled molten salt at a temperature of 1000° to 1800° F. for five minutes or more, and then removing the same and quenching it in a ten per cent brine quench bath, the carbon scale is readily brushed away and the design is sharply produced and preserved. By this method no acid penetration of the mold metal takes place and no corrosion of the mold results from the use of abrasive or other conventional cleansing methods.

In the initial use of molds it is the practice to heat them as with a blow torch or a gas flame. I have discovered that by immersing the molds in a puddled molten salt solution, as herein described, the molds are rapidly heated and at the same time given a surface treatment which is beneficial in reducing the tendency to foul and as an aid in removing the fouled surfaces of the molds after they have had extensive use.

It is evident from the foregoing description of the invention that the method of cleaning molds as herein described is highly advantageous over present day methods and reduces the cost of mold cleaning, as well as preserving the molds while expediting their use in glass plants.

Although one compound of salts suitable for the purpose has been herein illustrated and described, it is evident that any salt capable of releasing nitrogen in the presence of carbon at high temperature would be suitable for the purpose of scaling off the carbon to renew the mold surface.

I claim:

The method of cleaning carbon deposits from the fouled surface of molds for forming glass articles, which comprises immersing the fouled surface in a bath of molten barium cyanide, having the following reaction, at a temperature of 1000° to 1800° F.:

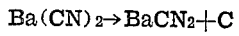

(barium cyanide)  (barium cyanamide)  (carbon)

removing the mold surface from the salt, and quenching the same in a ten percent brine bath.

TAYLOR H. BEECH.

REFERENCES CITED

The following references are of record in the file of this patent:

UNITED STATES PATENTS

| Number | Name | Date |
| --- | --- | --- |
| 1,120,272 | Bule | Dec. 8, 1914 |
| 2,159,261 | Durham | May 23, 1939 |
| 2,368,955 | Weesner | Feb. 6, 1945 |
| 2,380,284 | Young | July 10, 1945 |